United States Patent [19]

Okuyama et al.

[11] 4,323,628
[45] Apr. 6, 1982

[54] MAGNETIC RECORDING MEDIUM

[75] Inventors: Kiyotaka Okuyama; Akihiko Hosaka, both of Tokyo, Japan

[73] Assignee: TDK Electronics Co., Ltd., Tokyo, Japan

[21] Appl. No.: 175,533

[22] Filed: Aug. 5, 1980

[30] Foreign Application Priority Data

Aug. 17, 1979 [JP] Japan .................................. 54/104606

[51] Int. Cl.³ ............................................. B32B 27/30
[52] U.S. Cl. ................ 428/425.9; 428/522; 428/694; 428/696; 428/900
[58] Field of Search ............................. 427/127–132, 427/48; 428/900, 522, 694, 696, 425.9

[56] References Cited

U.S. PATENT DOCUMENTS 4,234,438 11/1980 Horigome et al. .................. 427/128

Primary Examiner—Bernard D. Pianalto
Attorney, Agent, or Firm—Oblon, Fisher, Spivak, McClelland & Maier

[57] ABSTRACT

A magnetic recording medium comprises a substrate coated with a magnetic composition comprising a magnetic powder in a binder comprising a vinyl chloride-vinyl acetate vinyl alcohol copolymer having more than 10 wt. % of vinyl alcohol component and a vinyl chloride polymer-impregnated nitrocellulose which is crosslinked with a polyisocyanate.

3 Claims, 2 Drawing Figures

MAGNETIC RECORDING MEDIUM

BACKGROUND OF THE INVENTION

1. Field of the Invention:

The present invention relates to an improved magnetic recording medium. More particularly, it relates to a magnetic recording medium which is suitable as a magnetic recording tape for a video tape recorder.

2. Description of the Prior Arts

Magnetic recording media are prepared by coating a composition comprising a magnetic powder in a binder with an organic solvent, on a tape or sheet substrate, and have been used as analogue or digital magnetic recording media.

In a recording or reproducing operation, severe friction of the magnetic recording medium to a magnetic head is caused. The surface of the magnetic layer should have high wearing resistance. When the magnetic recording medium is used for a video tape recorder, a relative running speed of the magnetic recording medium to the magnetic head is remarkably higher than that of the magnetic tape for an audio tape recorder. Therefore, the running friction is remarkably great and high wearing resistance and high running durability are required.

The magnetic layer substantially consist of a magnetic powder and a binder. In view of improvement of magnetic recording density, high packing density of the magnetic powder to the binder is required. When a suitable magnetic field is applied to the magnetic layer before drying and setting so as to impart the magnetic orientation, the magnetic powder should have orientation in high level. The physical properties of the binder and properties of the surface layer of the binder and the dispersed condition of the magnetic powder should be selected so as to give suitable wearing resistance, running durability and magnetic orientation.

It has been proposed to use the binder comprising nitrocellulose and polyurethane from the viewpoint of the above-mentioned characteristics. This binder can form a magnetic layer having smooth surface, however, it is not satisfactory because of disadvantages of difficulty of high packing density of the magnetic powder, difficulty of high orientation and easy wearing of the magnetic layer.

Certain other proposals have been mode, however, any magnetic recording medium having all of the above-mentioned required characteristics has not been found.

SUMMARY OF THE INVENTION

It is an object of the present invention to provide a magnetic recording medium which has excellent characteristics of the wearing resistance, the running durability and the magnetic orientation so as to maintain the satisfactory reliability in severe running conditions for a video tape recorder etc.

The foregoing and other objects of the present invention have been attained by providing a magnetic recording medium comprising a substrate coated with a magnetic composition comprising a magnetic powder in a binder comprising a vinyl chloride-vinyl acetate vinyl alcohol copolymer having more than 10 wt. % of vinyl alcohol component and a vinyl chloride polymer-impregnated nitrocellulose which is crosslinked with a polyisocyanate.

DETAILED DESCRIPTION OF THE PREFERRED EMBODIMENTS

Figure 1:
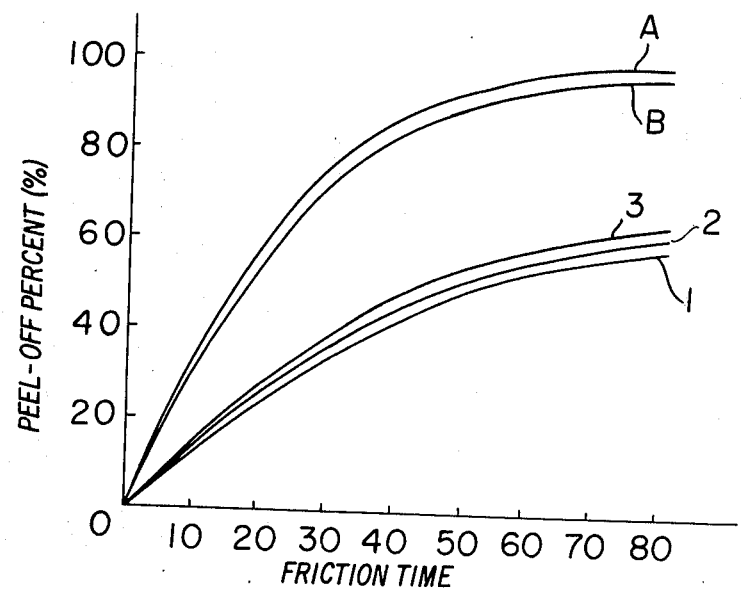
FIG. 1 is a graph showing the relation of peel-off percents of samples obtained in the examples of the present invention and the references to friction times.

Various characteristics such a viscosity, dry hardness, solubility in organic solvents, and dispersibility for a magnetic powder of vinyl chloride-vinyl acetate copolymers are varied depending upon the content of vinyl alcohol component. The vinyl chloride-vinyl acetate copolymer having more than 10 wt. % of vinyl alcohol component are effective for improving the above-mentioned characteristics. This fact has been already known. Vinyl alcohol is easily adsorbed on a magnetic powder. The magnetic powder is well mixed in the binder to be highly dispersed when the binder comprises vinyl alcohol component. Therefore, vinyl alcohol component contributes for improvement of the characteristics.

Advantages of incorporation of nitrocellulose will be illustrated.

Nitrocellulose has high affinity to the magnetic powder and it is used for imparting high dispersibility of the magnetic powder. Nitrocellulose is highly cosoluble with vinyl chloride-vinyl acetate copolymer. The high dispersibility of the magnetic powder in nitrocellulose is further improved in the binder comprising the vinyl chloride-vinyl acetate copolymer. The orientation of the magnetic powder and the surface smoothness of the magnetic layer are further improved by synergism of nitrocellulose and the vinyl chloride-vinyl acetate copolymer.

When nitrocellulose is combined with a polyisocyanate, the hydroxyl groups remaining in nitrocellulose without nitration are crosslinked with isocyanate groups of the polyisocyanate whereby electromagnetic characterisitcs and wearing resistance required for magnetic recording media are remarkably improved by high dispersibility of the magnetic powder in nitrocellulose and high mechanical strength resulting from the crosslinkage when such binder is used for the magnetic tape etc.

Nitrocellulose has firing property by itself and careful consideration for preventing firing is needed in handling whereby it has been required to incorporate 30 to 35 wt. % of isopropyl alcohol to nitrocellulose under the regulation to prevent an explosion caused by dusting in air by drying fine particles of nitrocellulose in order to keep safety in the storage and the handling of nitrocellulose. When hydroxyl groups of nitrocellulose are crosslinked with isocyanate groups of the polyisocyanate, at least part of isocyanate groups of the polyisocyanate react with hydroxyl groups of isopropyl alcohol impregnated in nitrocellulose for safety, whereby the degree of crosslinkage is lowered to reduce the effect for improving the wearing resistance and the running friction characteristics of the magnetic recording medium.

In order to overcome the disadvantages, it has been proposed to improve physical characteristics by blending and kneading isopropyl alcohol-impregnated nitrocellulose with a plasticizer such as dibutyl phthalate or dioctyl phthalate at a ratio of 15 wt. % based on the solid components of nitrocellulose and vaporizing isopropyl alcohol on a hot two roll-mill to prepare plasticizer-impregnated nitrocellulose chips and blending the polyisocyanate to the nitrocellulose chips to effectively react the active isocyanate groups to improve the mechanical properties.

The magnetic recording medium prepared by using said binder, however, has disadvantages caused by the plasticizer such as dibutyl phthalate impregnated in the binder, that the running trouble or the creak sound are caused by increasing the friction in running when it is used for a video tape recorder and the magnetic layer is peeled off by the friction to a magnetic head in severe test for the friction of the magnetic layer such as a still reproducing test for reproducing a still image and the still image is lost for only short time.

In accordance with the present invention, vinyl chloride polymer is impregnated into nitrocellulose instead of isopropyl alcohol or plasticizers such as dibutyl phthalate. When only a combination of vinyl chloride-vinyl acetate copolymer and nitrocellulose is used as the binder, the magnetic layer is soft to be easily peeled off from a substrate and accordingly, the polyisocyanate is incorporated into said binder whereby the hard magnetic layer having high bond strength to the substrate and having excellent wearing resistance can be formed.

The preparation of the magnetic recording media by using said binder will be illustrated.

The magnetic powder, the vinyl chloride-vinyl acetate copolymer having more than 10 wt. % of vinyl alcohol component and the vinyl chloride polymer-impregnated nitrocellulose and the polyisocyanate are thoroughly mixed with suitable mixed solvent. The mixing can be carried out by using suitable equipments such as a ball-mill. A small amount of a lubricant can be incorporated.

It is usual to blend about 3 to 10 wt. parts of the vinyl chloride-vinyl acetate vinyl alcohol copolymer having more than 10 wt. % of vinyl alcohol component), about 3 to 10 wt. parts of the vinyl chloride polymer-impregnated nitrocellulose and about 5 to 20 wt. parts of the polyisocyanate to 100 wt. parts of the magnetic powder. The characteristics of magnetic tapes are varied depending upon the usages and accordingly, the ratios can be modified over said ranges for the magnetic composition.

The lubricant is preferably incorporated at a ratio of about 1 to 2 wt. parts per 100 wt. parts of the magnetic powder. The solvent is preferably incorporated at a ratio of about 150 to 250 wt. parts per 100 wt. parts of the magnetic powder. The lubricant and the solvent are varied depending upon the formulation of the major components of the binder.

The typical solvents are mixed solvents comprising methyl ethyl ketone, methyl isobutyl ketone and toluene.

The typical lubricants are silicone oils.

The typical magnetic powders are $\gamma$—$Fe_2O_3$ (cobalt-doped), Fe—Co—Ni alloy $\gamma$—$Fe_2O_3$, $Fe_3O_4$, and $CrO_2$.

The components are thoroughly mixed and a suitable amount of the polyisocyanate as the crosslinking agent is added and the mixture is further mixed to prepare the magnetic composition. The magnetic composition is coated on suitable substrate such as polyethyleneterephthalate film in uniform thickness. The coating method can be the conventional methods such as the doctor method, the reverse roll method, the gravure method and the flow-spread method depending upon a required thickness of the magnetic layer.

The magnetic composition is coated by the suitable method to provide a desired dry thickness. Suitable surface processing by the calender treatment and suitable hot hardening treatment are carried out. The resulting product is cut in a designated size to obtain the magnetic recording medium.

The present invention will be further illustrated by certain examples and references which are provided for purposes of illustration only and are not intended to be limiting the present invention.

EXAMPLE 1

A composition of the following components was prepared.

| | |
|---|---|
| $\gamma$-$Fe_2O_3$ magnetic powder (Co-doped) | 400 wt. parts |
| Polyurethane resin (Nippolan 5033 manufactured by Nippon Polyurethane) | 70 wt. parts |
| Vinyl chloride-vinyl acetate copolymer (vinyl alcohol component: 12%) | 15 wt. parts |
| Nitrocellulose (impregnating vinyl chloride polymer) | 15 wt. parts |
| Lubricant | 5 wt. parts |
| Methyl ethyl ketone | 280 wt. parts |
| Methyl isobutyl ketone | 280 wt. parts |
| Toluene | 280 wt. parts |

EXAMPLE 2

A composition of the following components was prepared.

| | |
|---|---|
| $\gamma$-$Fe_2O_3$ magnetic powder (Co-doped) | 400 wt. parts |
| Polyurethane resin (Nippolan 5033 manufactured by Nippon Polyurethane Co.) | 50 wt. parts |
| Vinyl chloride-vinyl acetate copolymer (vinyl alcohol component: 12 wt. %) | 25 wt. parts |
| Nitrocellulose (impregnating vinyl chloride polymer) | 25 wt. parts |
| Lubricant | 5 wt. parts |
| Methyl ethyl ketone | 280 wt. parts |
| Methyl isobutyl ketone | 280 wt. parts |
| Toluene | 280 wt. parts |

EXAMPLE 3

A composition of the following components was prepared.

| | |
|---|---|
| $\gamma$-$Fe_2O_3$ magnetic powder (Co-doped) | 400 wt. parts |
| Polyurethane resin (Nippolan 5033 manufactured by Nippon Polyurethane Co.) | 30 wt. parts |
| Vinyl chloride-vinyl acetate copolymer (vinyl alcohol component: 12%) | 35 wt. parts |
| Nitrocellulose (impregnation vinyl chloride polymer) | 35 wt. parts |
| Lubricant | 5 wt. parts |
| Methyl ethyl ketone | 280 wt. parts |
| Methyl isobutyl ketone | 280 wt. parts |
| Toluene | 280 wt. parts |

In each of Examples 1, 2 and 3, the components were thoroughly mixed and dispersed in a ball mill and 8 wt. parts of polyisocyanate (Colonate L manufactured by Nippon Polyurethane Co.) was incorporated. The mixture was further uniformly mixed to obtain each magnetic composition. The composition was coated in a thickness of 4μ (in dry) on a polyethyleneterephthalate film having a thickness of 15μ. The surface of the coated layer was processed by a super calender treatment and then, cured, by heating it at about 80° C. for 48 hr. The product was cut in a width of ½ inch (1.27 cm) to prepare each magnetic tape. The magnetic tapes prepared in Examples 1, 2 and 3 are referred as Samples 1, 2 and 3.

As comparative references, the other kinds of nitrocellulose which are different from vinyl chloride polymer-impregnated nitrocellulose, were respectively used to prepare magnetic tapes. These magnetic tapes were prepared by using the composition having the following formula as References A and B.

| REFERENCE A: | |
|---|---|
| γ-Fe$_2$O$_3$ magnetic powder (Co-doped) | 400 wt. parts |
| Polyurethane resin (Nippolan 5033 manufactured by Nippon Polyurethane Co.) | 50 wt. parts |
| Vinyl chloride-vinyl acetate copolymer (vinyl alcohol component: 12 wt. %) | 25 wt. parts |
| Nitrocellulose (impregnating dibutyl phthalate; H-½ sec. Asahi Kasei Kogyo) | 25 wt. parts |
| Lubricant | 5 wt. parts |
| Methyl ethyl ketone | 280 wt. parts |
| Methyl isobutyl ketone | 280 wt. parts |
| Toluene | 280 wt. parts |

| REFERENCE B: | |
|---|---|
| γ-Fe$_2$O$_3$ magnetic powder (Co-doped) | 400 wt. parts |
| Polyurethane resin (Nippolan 5033 manufactured by Nippon Polyurethane Co.) | 50 wt. parts |
| Vinyl chloride-vinyl acetate copolymer (vinyl alcohol component: 12 wt. %) | 25 wt. parts |
| Nitrocellulose (isopropyl alcohol: RS-20 Daicel Co.) | 25 wt. parts |
| Lubricant | 5 wt. parts |
| Methyl ethyl ketone | 280 wt. parts |
| Methyl isobutyl ketone | 280 wt. parts |
| Toluene | 280 wt. parts |

In References A and B, the magnetic tapes were prepared by the process of Examples 1, 2 and 3. The resulting magnetic tapes are referred as Samples A and B.

The wearing tests and the running durability tests for magnetic tapes as Samples 1, 2 and 3 in Examples 1 to 3 and Samples A and B in References A and B were carried out. The results are shown in FIGS. 1 and 2.

Figure 2:
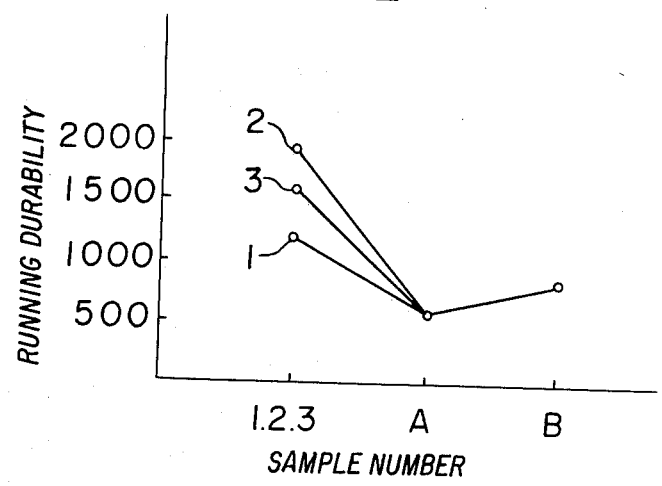
FIG. 2 is a graph showing running durabilities of the same samples.

FIG. 1 is a graph showing the relation of peel-off percents of the samples to friction times in the tests using taper grinding tester.

As it is clear from FIG. 1, Samples 1, 2 and 3 of the present invention had remarkably superior wearing resistances to those of Samples A and B as the conventional magnetic tapes.

The coated layers of Samples A and B in Reference were substantially peeled off at about 60 of friction times. On the other hand, the peel-off percents of Samples 1, 2 and 3 of the present invention are about 60% at 60 of friction times. This fact shows excellent wearing resistances superior to those of References.

FIG. 2 is a graph showing the running durabilities of Samples 1, 2 and 3 and Samples A and B. As it is clear from FIG. 2, the running durabilities of Samples A and B of the References are less than 1,000 times whereas the running durabilities of Samples 1, 2 and 3 of the present invention are greater than 1,200 times. The running durability of the magnetic tape of the present invention is remarkably superior to those of the references.

As described above, in accordance with the present invention it provides the magnetic recording medium prepared by coating the magnetic composition comprising the magnetic powder in the binder, on the substrate wherein said binder comprises vinyl chloride polymer-impregnated nitrocellulose and polyisocyanate and vinyl chloride-vinyl acetate vinyl alcohol copolymer having more than 10 wt. % of vinyl alcohol. The wearing resistance and the running durability of the magnetic tape are remarkably improved by synergism of the vinyl chloride polymer-impregnated nitrocellulose and the other components. The characteristics of the magnetic recording medium of the present invention are remarkably superior to those of the conventional magnetic recording medium prepared by using nitrocellulose impregnated with isopropyl alcohol or dibutyl phthalate as a binder. Moreover, the dispersibility of the magnetic powder is remarkably high because of high affinity of the magnetic powder to nitrocellulose and the synergism of nitrocellulose and vinyl alcohol component whereby the packing density of the magnetic powder to the binder can be increased and the magnetic orientation can be improved in the magnetic recording medium.

The components used for the preparation of the present invention are easily available in low costs and the magnetic recording medium can be prepared by the conventional processes. This contributes remarkable developments to the magnetic recording medium.

We claim:

1. A magnetic recording medium which comprises a substrate coated with a magnetic composition comprising a magnetic powder in a binder comprising a vinyl chloride-vinyl acetate vinyl alcohol copolymer having more than 10 wt. % of vinyl alcohol component and polyvinyl chloride impregnated nitrocellulose which is crosslinked with a polyisocyanate.

2. The magnetic recording medium according to claim 1 wherein said polyvinyl chloride impregnated nitrocellulose is obtained by replacing isopropyl alcohol in a nitrocellulose composition with polyvinyl chloride polymer.

3. The magnetic recording medium according to claim 1 wherein said composition comprises about 3 to 10 wt. parts of said vinyl chloride-vinyl acetate-vinyl alcohol copolymer, about 3 to 10 wt. parts of said polyvinyl chloride impregnated nitrocellulose, and about 5 to 20 wt. parts of said polyisocyanate to 100 wt. parts of said magnetic powder.

* * * * *